March 22, 1932. E. H. LICHTENBERG 1,850,113
COMBINED TAG LINE AND DIPPER TRIP OPERATING MECHANISM
Filed Jan. 19, 1928
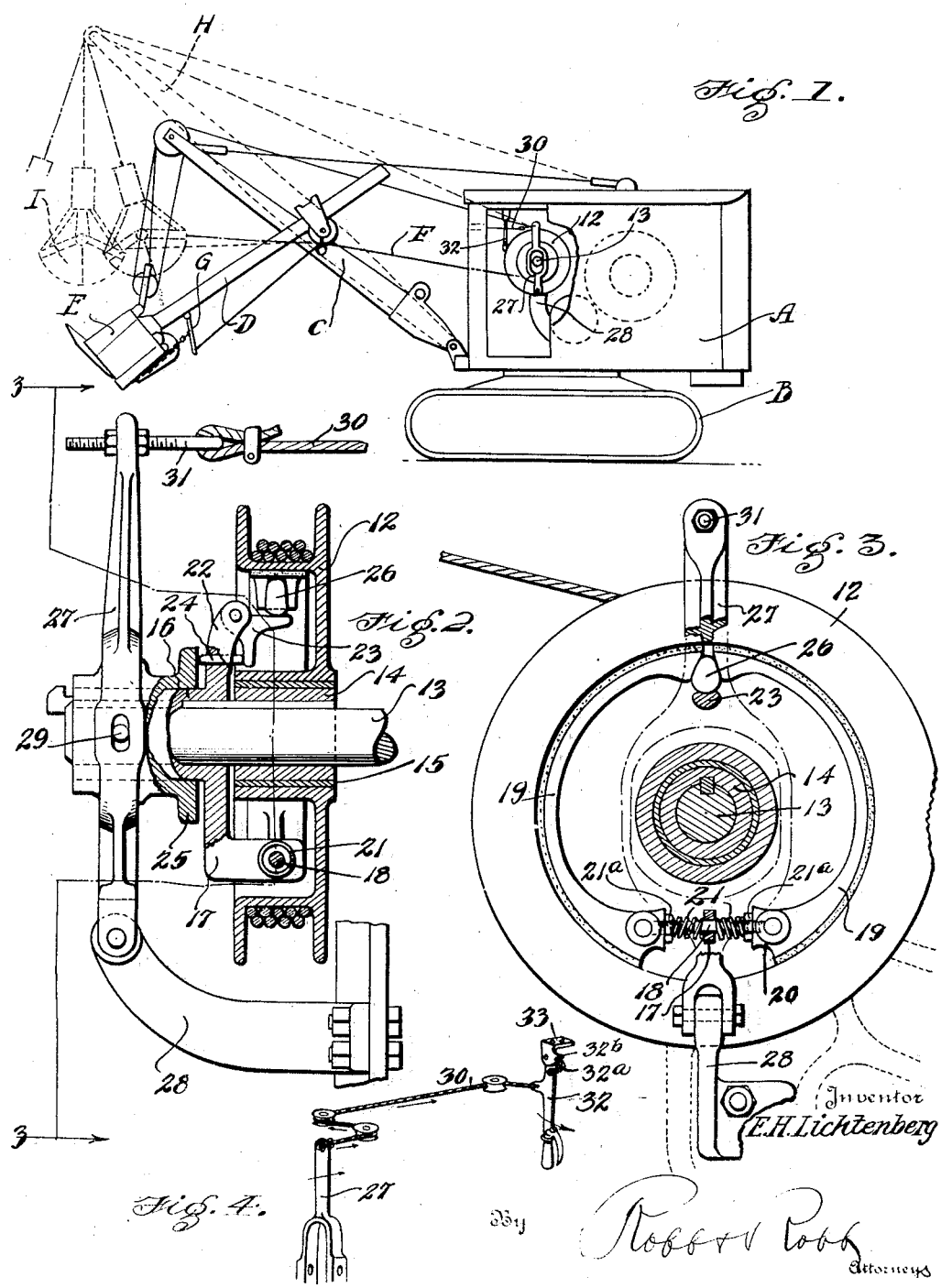
Inventor
E. H. Lichtenberg Patented Mar. 22, 1932

1,850,113

UNITED STATES PATENT OFFICE

ERICH H. LICHTENBERG, OF MILWAUKEE, WISCONSIN, ASSIGNOR TO KOEHRING COMPANY, OF MILWAUKEE, WISCONSIN, A CORPORATION

COMBINED TAG LINE AND DIPPER TRIP OPERATING MECHANISM

Application filed January 19, 1928. Serial No. 247,938.

It is the purpose of the present invention to provide a simple and effective type of actuating mechanism for use in conjunction with the dipper trip or tag line of excavating or material handling apparatus of the Koehring convertible shovel-crane design.

Heretofore the mechanism designed for this work has embodied a winding drum so mounted in relation to a constantly rotating disk that it may be bodily shifted to produce frictional contact with the disk sufficient to effect slack take up or dipper tripping action. Such construction or arrangement has its advantages but these improvements are distinguished therefrom by mounting the winding or retrieving drum loosely upon an engine driven shaft and providing a clutch device driven from said shaft and so coacting with the drum as to impart the desired tension on the line whether the line is acting as a dipper trip or tag line.

My invention comprehends as its novel characteristic the provision of a free take up drum, a rotatable friction device therefor, and means for maintaining just sufficient frictional contact of the same with the drum to provide a normal slack take up action on a dipper or bucket line while permitting application of greater frictional contact at will whereby to impart a sudden actuating or tripping movement to the line.

Other objects and advantages of the invention will be hereinafter set forth and the novel features thereof defined by the appended claims.

In the accompanying drawing:—

Figure 1 is a side elevation of a convertible shovel-crane apparatus of the type to which this invention is applicable;

Figure 2 is a side elevation of the slack taking up mechanism, parts being broken away and shown in section to disclose more clearly the details of construction;

Figure 3 is a vertical sectional view taken about on the plane indicated by the line 3—3 of Figure 2; and Figure 4 is a diagrammatic showing of the manual actuating means for the clutch device used in this mechanism.

Like reference characters designate corresponding parts throughout the several figures of the drawings.

When the crane apparatus in which this invention is used is arranged to act as a shovel the swing body A supported on the traction unit B is provided with the shovel boom C carrying the dipper stick D and the dipper E. The dipper is provided with a dipper trip line F which is connected to the trip lever G at one end and at its other end is wound upon a drum 12 which is the tag line drum of the conventional crane apparatus, said drum being carried loosely by a shaft 13 operated from the prime mover of the excavating apparatus. As a bearing for the drum 12 I preferably provide a collar 14 which is keyed to the shaft 13 and is surrounded by a bronze bushing 15 on which the drum 12 revolves.

Coacting with the drum 12 is a clutch device which includes the driven member 16 in the form of a sleeve which is keyed to the driven shaft 13 and provided at one side with an angle lever or extension 17 having its extremity apertured to receive the eye bolt 18. The opposing eyes at the end of this bolt extend into the bifurcated ends of coacting friction shoes 19 in the ends of which the pintles 20 are positioned to receive the eye bolt. At opposite sides of the end of the extension 17 and surrounding the eye bolt are springs 21 adjustable by means of nuts 21a and affording a yielding driving connection between the member 16 and the friction shoes 19 which are constantly driven by the shaft. These springs furthermore function as equalizers in order to insure the proper frictional contact between the shoes and the inner periphery of the drum 12 with which they are associated. At the opposite side, the sleeve 16 is provided with an extension 22 which carries a bell crank 23 with one arm of which a pin 24 mounted in the extension coacts under the control of the shifter collar 25 surrounding the sleeve 16. The other arm of the bell crank coacts with a wedge member 26 which is interposed between the contiguous extremities of the split shoes opposite the connection of the member 17 with the eye bolt.

The shoes are actuated so as to expand into contact with the drum 12 by means of the shifter yoke or lever 27 which at its lower end is pivotally mounted upon a bracket 28 secured to the frame of the body A and at an intermediate point interlocks with trunnions 29 formed on the collar 25. At its upper end the lever has connected to it the actuating cable 30 through the instrumentality of the adjustable eye bolt 31, said cable being in turn connected to a depending handle lever 32 supported by the bracket 33 at a point convenient to the position of the operator in the cab of the apparatus.

Normally the weight of the lever 32 is sufficient to hold the clutch device in coacting relation to the drum 12 so that a sufficient amount of frictional contact is produced to tend to wind the dipper trip line F upon the drum. This contact, however, is insufficient to trip the dipper door which tripping action must be accomplished by a positive actuation of the dipper trip line through the shifting of the handle 32 which in turn forces the lever 27 to move the shifter collar inwardly, pressing to a greater extent upon the pin 24 and forcing the wedge 26 to separate the shoes 19. By the movement of the handle in the manner referred to, sufficient tension can be placed upon the dipper trip line to displace the latch for the door in the customary manner. Releasing the lever will cause it to assume its pendent or vertical position with the slack taking up action normalized.

If it is desired to convert this apparatus to a material handling crane the shovel boom and its equipment is replaced with the crane boom H shown in dotted lines in Figure 1. A clamshell or other bucket I is supported by this boom and the end of the line F is connected to this bucket in the usual manner. To provide for the greater tension upon the line F which now is to act as a tag line, the necessary adjustment of the clutch device is accomplished by adjusting the bolt 31 until sufficient pressure is exerted upon the shoes 19 to increase the take-up action of the drum.

It will thus be seen that the line F may be employed in a dual capacity by merely changing the connection of the end of the same to the shovel or bucket which is being employed, as the case may be, and effecting an adjustment of the clutch actuating connection.

Further than this, it is possible to convert the dipper trip line to tag line work without adjusting the connection 31 as above described by providing the handle 32 with a latch member 32a which is engageable with a notched segment 32b formed on the bracket 33, so as to hold the clutch device in such frictional engagement with the drum 12 as to produce slack take-up action on the line sufficient for tag line work. This lever 32 is capable of manipulation to swing the bucket I relative to the boom, as shown in dotted lines in Figure 1. By moving the lever to effect winding of the line upon the drum the bucket may be swung inwardly toward the boom pivot, thereby enabling the load to be dropped at a point within the radius of the boom swing. By such manipulation, followed by a reverse movement of the lever and a swing of the boom, the bucket may be swung beyond the radius of the boom. These movements, therefore, eliminate the necessity for vertical adjustment of the boom unless this is desired.

Having thus described my invention, what I claim as new and desire to secure by Letters Patent of the United States is:—

1. In convertible material handling apparatus of the crane-shovel type, including interchangeable boom and bucket instrumentalities, the combination of a tag line drum, a tag line connected to said drum, variable tension clutch means constantly coacting with said drum to normally produce a greater tension on said line for tag line take-up action when the apparatus is arranged as a crane, means for adjusting the clutch means to convert said tag line take-up action to the lesser tension take-up action on said line for slack take-up action when the apparatus is changed to the shovel type to act as a dipper trip slack take-up and tripping means, said tag line drum constituting a dipper latch trip means in the last named arrangement, and means to shift said clutch means to effect dipper trip action.

2. In convertible material handling apparatus of the crane-shovel type, including interchangeable boom and bucket instrumentalities, the combination of a tag line drum, a tag line connected to said drum, variable tension clutch means constantly coacting with said drum to normally produce a greater tension on said line for tag line take-up action when the apparatus is arranged as a crane, means for adjusting the clutch means to convert said tag line take-up action to the lesser tension take-up action on said line for slack take-up action when the apparatus is changed to the shovel type to act as a dipper trip slack take-up and tripping means, said tag line drum constituting a dipper latch trip means in the last named arrangement, and a handle lever connected to said clutch means for operating the same to effect dipper tripping.

3. In convertible material handling apparatus of the crane-shovel type, including interchangeable boom and bucket instrumentalities, the combination of a tag line drum, a tag line connected to said drum, variable tension clutch means constantly coacting wth said drum to normally produce a greater tension on said line for tag line take-up action when the apparatus is arranged as a crane, means for adjusting the clutch means to convert said tag line take-up action to the lesser tension take-up action on said line for slack take-up action when the apparatus is changed to the shovel type to act as a dipper trip slack take-up and tripping means, said tag line drum constituting a dipper latch trip means in the last named ararngement, a handle lever connected to said clutch means for operating the same to effect dipper tripping, and holding means for holding the handle lever in a position to maintain the clutch means adjusted to produce tag line take-up action.

4. In a convertible material handling apparatus of the crane-shovel type, including interchangeable boom and bucket instrumentalities, the combination of a tag line drum, a tag line connected to said drum at one end, the other end of said line being connected to the crane bucket when the apparatus is arranged as a crane and to the dipper trip means when converted to a shovel apparatus, a clutch device coacting with said drum, means for adjusting the clutch to afford the different slack take-up actions in the respective arrangements aforesaid and dipper tripping operation, said clutch device including a shifter collar, and a lever for operating said collar to impart either slack take-up or dipper trip action.

5. In a convertible material handling apparatus of the crane-shovel type, including interchangeable boom and bucket instrumentalities, the combination of a tag line drum, a tag line connected to said drum at one end, the other end of said line being connected to the crane bucket when the apparatus is arranged as a crane and to the dipper trip means when converted to a shovel apparatus, a clutch device coacting with said drum, means for adjusting the clutch to afford the different slack take-up actions in the respective arrangements aforesaid and dipper tripping operation, said clutch comprising friction shoes coacting with said drum and wedge means coacting with said shoes, and lever shifter means cooperating with said wedge means to effect variable contact of the friction shoes with said drum.

In testimony whereof I affix my signature.

ERICH H. LICHTENBERG.